United States Patent [19]
Faber et al.

[11] Patent Number: 5,540,895
[45] Date of Patent: Jul. 30, 1996

[54] DEVICE FOR THE TREATMENT OF MIXTURE OF STEAM AND AIR CONTAMINATED WITH SULPHUROUS GASES, FORMED DURING THE GRANULATION AND DEHYDRATION OF BLAST FURNACE SLAG

[75] Inventors: Ernest Faber; Romain Frieden; Marc Solvi; Louis Schmit; Leon Ulveling, all of Luxembourg, Luxembourg

[73] Assignee: Paul Wurth S.A., Luxembourg, Luxembourg

[21] Appl. No.: 351,587

[22] Filed: Dec. 7, 1994

Related U.S. Application Data

[63] Continuation-in-part of Ser. No. 75,615, Jun. 3, 1994, abandoned.

[51] Int. Cl.[6] ............................ C03B 19/00; B01D 50/00
[52] U.S. Cl. ..................... 422/172; 422/171; 422/170; 65/141; 261/DIG. 9
[58] Field of Search .................. 423/243.01, 243.06, 423/243.1, 210; 65/19, 141; 261/116, 117, DIG. 9; 55/228, 260, 223, 210; 95/199, 235, 225, 216; 422/182, 168, 170, 171, 172

[56] References Cited

U.S. PATENT DOCUMENTS

| | | | |
|---|---|---|---|
| 3,650,517 | 3/1972 | Messing | 65/134.9 |
| 3,738,820 | 6/1973 | Osborne et al. | 65/19 |
| 4,289,519 | 9/1981 | Monteyne | 65/141 |
| 4,494,971 | 1/1985 | Monteyne et al. | 65/19 |
| 4,661,136 | 4/1987 | Dorn et al. | 65/404 |
| 4,758,260 | 7/1988 | Geropp et al. | 65/19 |
| 5,041,274 | 8/1991 | Kagi, Sr. | 423/243.01 |

*Primary Examiner*—Robert J. Warden
*Assistant Examiner*—Hien Tran
*Attorney, Agent, or Firm*—Fishman, Dionne & Cantor

[57] ABSTRACT

A device in which a mixture of steam and contaminated air is first of all channelled into an upward stream and that the mixture subsequently flows as a downward stream in a vessel maintained at reduced pressure. The device further includes an arrangement for spraying an alkaline aqueous solution into the downward stream of the mixture of steam and contaminated air. The decontaminated uncondensed gases are thereby removed from the vessel by a forced and adjustable stream which creates and maintains a reduced pressure inside the vessel.

19 Claims, 2 Drawing Sheets

DEVICE FOR THE TREATMENT OF MIXTURE OF STEAM AND AIR CONTAMINATED WITH SULPHUROUS GASES, FORMED DURING THE GRANULATION AND DEHYDRATION OF BLAST FURNACE SLAG

CROSS-REFERENCE TO RELATED APPLICATIONS

This application is a continuation-in-part of U.S. application Ser. No. 08/075,615 filed Jun. 3, 1994 now abandoned.

BACKGROUND OF THE INVENTION

The present invention relates generally to a new and improved design of a plant for the treatment and removal of contaminated gases formed during the production of granulated slag. More particularly, this invention relates to a design of a plant for the treatment of a mixture of steam and air contaminated with sulphurous gases formed during the granulation process of blast furnace slag.

A number of processes and plants are known at the present for the granulation of blast furnace slag. One such known process, for example, is to inject a powerful jet of water into a flow of molten slag with the aid of a spraying head. Advantageous embodiments of such spraying heads are described, for example, in European Patent Application EP 0,082,279.

A control problem in a plant of this type is the steam contaminated, among other things, with sulphurous gases including hydrogen sulphide, $H_2S$ and sulphur dioxide, $SO_2$, which are generated in large quantities and at essentially variable rates when the water is injected into molten slag.

After the granulation the slag can be dehydrated, for example in a rotary cylinder bounded externally by a filtering surface. This process and the corresponding plant are described in U.S. Pat. No. 4,204,855 which is incorporated herein by reference. During this dehydration of slag, a mixture of steam and air, which is contaminated with sulphurous gases, is also formed.

The contaminated vapors produced during the granulation are sometimes discharged untreated into the atmosphere, which creates a health hazard and constitutes a nuisance for the inhabitants dwelling near the factories, particularly in view of the unpleasant odor and toxicity of $H_2S$ (hydrogen sulphide).

Some plants are equipped with a closed condensation tower which is situated above the granulation basin in which the slag is cooled. In this condensation tower the hot gases and vapors rising by convection are sprayed with water by jets. The water spray originating from the jets and the condensates are recovered by chutes situated below the jets. However, these plants are not entirely satisfactory. Since the flow rates of slag and consequently the flow rates of ascending vapors and gas can vary as a function of time, it is difficult to create and maintain a stable and sufficient pressure reduction by condensing the steam in the region of the jets. At certain times an overpressure is thus created in the condensation region of the tower, which prevents the vapors from rising as far as the jets. Under these conditions, sufficient condensation of the steam and, thus, effective removal of the sulphurous gases is no longer ensured. Contaminated vapors can then escape uncontrollably into the open air.

German Patent Application P 3511958.6, filed on Apr. 2, 1985 describes a plant for the granulation of blast furnace slag which employs a closed gas circulation system. The vapors generated when water is injected into the molten slag are entrained by a jet of water directly into the water-filled granulation basin, to be partially condensed therein. The residual vapors and gases given off from the granulation basin are sprayed with water with the aid of jets installed in a condenser situated above the water reserve. The rising vapors and the sprayed water consequently form two countercurrent streams. It is claimed that the residual gases and vapors which are not removed by this scrubbing are led back towards the spray head by an internal circulation, which is said to be created in the plant. The German document does not mention how to avoid an overpressure in the plant, which gives rise to an uncontrolled leakage of contaminated gases to the outside. Nor can this system be employed for retro fitting to an existing plant. The granulation plant must, in fact, be constructed so as to form a perfectly gastight system.

There is an obvious need for an improved process and plant for the treatment of a mixture of air and noxious vapors formed during the production of granulation of blast furnace slag and contaminated with sulphurous gases. In addition, a process is needed to treat effectively widely variable flow rates of contaminated vapors and which prevents untreated air or vapors from escaping to the outside of the plant.

SUMMARY OF THE INVENTION

The above-discussed and other drawbacks and deficiencies of the prior art are overcome or alleviated by the device for the treatment of a mixture of contaminated steam and air, which is formed during the production of blast furnace slag granulate in a granulation plant. This device comprises a closed condensation tower situated above the granulation plant, intended to collect the mixture of vapors and gas, using at least one oblong vessel, closed at its lower end the open at its upper end, arranged vertically inside the closed tower, using jets arranged inside the vessel. These jets are connected to a distribution conduit for alkaline water and use at least one flow conduit for the scrubbing water and condensate which emerge into the lower end of the vessel. At least one suction conduit for the uncondensed gases is used that emerges into the lower part of the vessel. At least one variable-throughput extraction means is connected to the suction conduit for the purpose of removing the gases and maintaining a pressure reduction in the vessel.

The mixture of vapors and of air contaminated with sulphurous gases, which is formed during the granulation of blast furnace slag, is channelled into a rising stream. This upward movement is partially a convection movement, but is strengthened by the extraction of the uncondensed treated gases from the plant.

An adjustable dynamic reduced pressure is created inside the vessel by the controlled removal of the uncondensed gases from the lower part of the vessel towards the outside of the plant. The condensation of the steam by water spraying also contributes to maintaining the vessel at reduced pressure. This pressure reduction creates a downward stream of the mixture of vapors and gas in the vessel. The condensation of the vapors results from cooling by spraying of cold water into the vapors. The removal of the sulphurous gases, including $H_2S$ and $SO_2$, results from absorption, precipitation and/or from oxidation-reduction reactions of the sulphurous gases in the finely sprayed alkaline aqueous solution. It should be noted that water is sprayed into the mixture of vapors and gases descending in the vessel. A forced and parallel stream of spraying water and of gas and vapors is consequently established between the open upper end and the closed lower end of the vessel. An advantage is that the spraying water condenses the vapors, reacts with the sulphurous gases and at the same time entrains the uncondensed gases towards the bottom of the vessel, where it is removed. A possible accumulation of air and of uncondensed vapors resulting in a reflux which prevents the contaminated vapors from reaching the condensation zone is not possible. The aforementioned phenomenon, frequently encountered in the prior art, is thus effectively eliminated.

The present invention can be retrofitted to most of the existing blast furnace slag granulation plants at a relatively low cost. In fact, in contrast to the plant described in German Patent Application P 3511958.6, there is no need for the granulation plant to be gastight.

The flow rate of discharged gas is adjusted so as to maintain the plant under reduced pressure, which prevents the contaminated vapors from escaping from the plant at any time. During the granulation of blast furnace slag, the flow rates of slag and, consequently, the flow rates of vapors and sulphurous gases which are formed, are highly variable. The decontamination and condensation plant will consequently need to be capable of fully controlling widely variable flows of vapors and contaminated air. In accordance with the present invention, varying the flow rate of the extraction stream of decontaminated air from the vessel provides the necessary flexibility to compensate for the wide variations into the flow rates of contaminated vapors and air to be treated.

In accordance with a preferred embodiment of the present invention, the variable through-put means is a water jet pump, which makes it possible to scrub the uncondensed gases for a second time with an aqueous solution. The acidic sulphurous contaminants which may be present in the uncondensed gases discharged will thus be removed efficiently because, on leaving the pump, the gases and the alkaline solution are mixed turbulently, and this promotes exchanges between the two phases. This second treatment is even more efficient if the water employed for operating said pump is alkaline. It will also be noted that the water jet pump does not contain any moving mechanical parts and is particularly resistant to possible attack by corrosive agents.

The flow rate of gas drawn in by the water jet pump is directly proportional to the quantity of alkaline solution employed to make it operate. This results in the double advantage that the flow rate of discharged air can be easily controlled and that the ratio of the flow rate of discharged air to the flow rate of alkaline solution remains more or less constant, with the results that it assures an effective treatment of the discharged air when flow rates vary.

The alkaline solution employed for the water jet pump and the spraying water collected in the vessel are advantageously poured into the water circuit for cooling the slag, this water being rich in limestone. A proportion of the sulphur is then removed from the cooling water circuit in the form of gypsum with the dehydrated granulate.

In accordance with another preferred embodiment of the present invention, the variable through-put means is a gas-scrubber which makes it possible to scrub the uncondensed gases again. The gas-scrubber comprises a second vessel means having a closed lower end and an open upper end. The uncondensed gases from the closed condensation tower are delivered to the lower part of the second vessel and rise towards the open upper end of the vessel. Alkaline water is delivered, via a second distribution conduit means, to jet means arranged within said second vessel means and is sprayed onto the ascending gas.

The condensed gases and the alkaline water is collected at the closed bottom of the vessel and then evacuated from said vessel by at least one flow conduit means emerging into the lower end of said second vessel means to a retention basin means. The alkaline water is re-circulated to the jet means by a pump means connected to said retention basin and to said second distribution conduit means.

The uncondensed gases rise to the top of the second vessel and are evacuated outdoors.

The open upper end of said second vessel comprises, preferably, a grid on which water droplets contained in the steam of gas coalesce so that the formation of vapor is avoided.

In accordance with another preferred embodiment of the present invention a probe controls the flow rate of the variable throughput extraction means as a function of the pressure reduction measured inside the vessel. A constant pressure reduction is thus maintained inside the vessel when variable flow rates of vapors are formed. In accordance with another embodiment of the present invention, when the dehydration takes place in a separate (different) building, the vapors and gases formed in the granulate dehydration plant are treated in the condensation tower of the granulation plant. The aforementioned gases and vapors are conveyed towards the condensation tower by means of a chimney. This chimney may be optionally provided with a valve so as to be capable of controlling at any time the flow of gas carried by this route into the tower.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in both FIGURES.

DESCRIPTION OF THE PREFERRED EMBODIMENT

Figure 1:
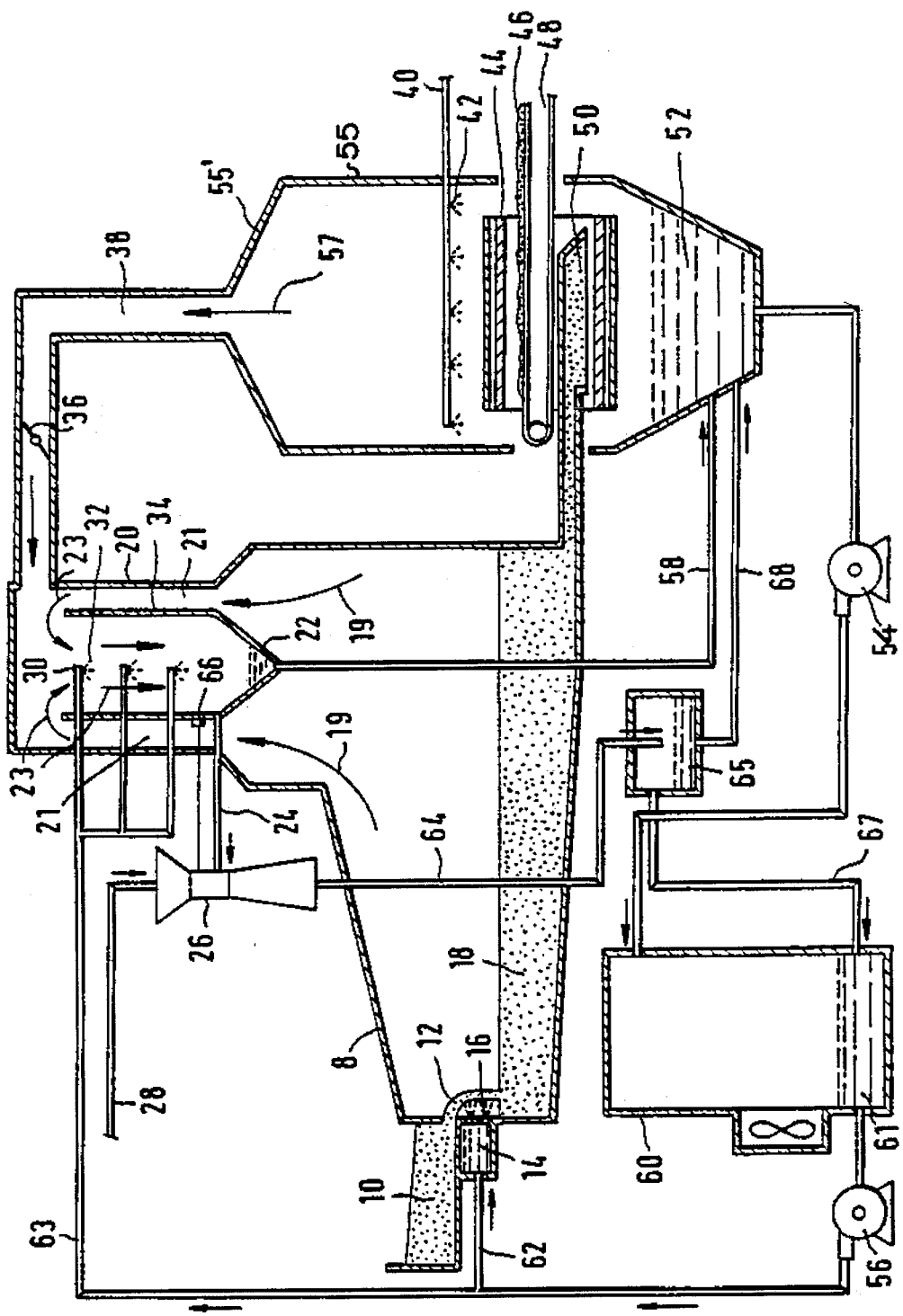
FIG. 1 is a diagrammatic elevational view, partly in cross section, of a preferred embodiment of the present invention of a plant for treatment of the contaminated vapors formed during the granulation of blast furnace slag.

FIG. 1 diagrammatically illustrates a granulation building 8 erected above a granulation plant. A powerful jet of water 16 is injected by means of spraying head 14 into a stream of molten slag 12 which is conveyed by a channel 10 from a blast furnace or from a slag ladle in the building 8. This jet 16 causes the formation of slag granulate which falls into cooling basin 18. From basin 18 the granulate is continuously removed towards dehydration plant 55 as described in U.S. Pat. No. 4,204,855. This plant 55 is separated from the granulation building 8 by a water barrier which prevents the gases that are formed during the granulation process from being entrained towards the dehydration plant 55.

The vapors and gases formed during the abrupt cooling of the molten slag by the water jet 16 and the gases and vapors given off from the basin 18 follow an upward movement, indicated by arrows 19, and are collected by a closed tower 20 situated above the basin 18. In this tower 20 there is a cylindrical or prismatic oblong vessel 34. Vessel 34 is closed at its lower base by a funnel-shaped bottom 22 and is open at its upper base. It can be seen that the vessel 34 is installed in the tower 20 so as to define a chimney 21 formed by a restriction of the cross-section of the tower 20. This chimney 21 channels the gaseous mixture made up of heated vapors, gases and air towards the entry of the vessel 34. The vessel 34 is maintained at a reduced pressure relative to the external atmosphere because of the continuous removal of the treated gases via suction conduit 24 situated in the lower part of the vessel 34. To assure that the pressure in vessel 34 is lower than the external atmosphere, the conduit 24 is connected to water jet pump 26 which maintains a downward flow 23 of the gaseous mixture to be treated in vessel 34.

Water jets 30 are installed in the vessel 34. Water jets 30 are preferably installed in a number of superimposed rows in the upper part of the vessel 34 and are connected to a feed conduit 63 for cold alkaline water. This arrangement makes it possible to spray cold alkaline water into the downward stream 23 of the gaseous mixture. The condensation of the vapors is obtained by intimate contact between the sprayed cold water 32 and the vapors. The decontamination of the contaminated air results from absorption, precipitation and/or oxidation-reduction reactions of the sulphurous gases in the alkaline aqueous solution. The spraying promotes contact between the two phases, and accerates and promotes the progress of these reactions. It will be noted that the sprayed jets of water have a secondary effect of reinforcing the dynamics of the downward flow of the gaseous mixture to be treated in the vessel 34 and of promoting suction of the uncondensed gases and vapors at the open upper end of the vessel 34. This effect is further promoted by the arrangement of the jets in superimposed rows. The spraying water and the condensate are collected by the funnel-shaped bottom 22 in the vessel 34, and are removed by a discharge conduit 58.

The feed conduit 63 of the jets 30 is preferably connected to a pressurized conduit 62 which feeds the granulation head or spraying head 14. This conduit 62 is provided with a pump 56 and is connected to a cooling tower 60. The latter forms part of a cooling circuit for the water employed for the granulation and the cooling of the blast furnace slag. The water originating from this slag cooling circuit is alkaline (pH between 8 and 9) and thus promotes the removal of the sulphurous gases. Because of the cooling circuit's high content of calcium washed out of the slag, the sulphurous gases precipitate, at least partially, in the form of gypsum, is finally removed together with the dehydrated granulate 46.

In the lower part of the vessel 34 the gaseous phase therefore contains essentially air which has undergone a first scrubbing. This air is drawn in by the water jet pump 26 and can be treated effectively for a second time if an alkaline aqueous solution 28 is employed to feed the water jet pump 26.

In fact, in the pump 26 a flow of alkaline aqueous solution 28 draws in the purified air originating from the vessel 34 by a venturi effect. On leaving the pump 26 the air and the alkaline aqueous solution 28 are mixed turbulently. The contaminants which may remain after the first scrubbing in the treated gas which is drawn in are then removed by reactions which are similar to those described hereinbefore.

The alkaline aqueous solution 28 employed for operating the water jet pump 26 can either originate from the cooling basin 18 or from another place in the water circuit used for granulating and cooling the slag. This is because the flow rate of the alkaline aqueous solution 28 is very low when compared with the flow rate of the granulation water. The water jet pump 26 can also operate with a specially prepared sodium hydroxide solution or with any other suitable basic solution. The air/alkaline water mixture emerging from the pump 26 is next conveyed via a conduit 64 into a closed basin 65 where the mixture is degassed. The air is removed from the upper pan of the closed basin 65 by means of a conduit 67 leading towards a basin 61 which form part of a cooling tower 60. The alkaline water is conveyed from the lower part of the closed basin 65 via a conduit 68 towards a settling basin 52 of the dehydration plant 55.

A preliminary degassing is not necessary if the air/alkaline water mixture is released directly into the basin 61 from the cooling tower 60.

A probe 66 installed in the lower part of the vessel 34 measures the pressure reduction inside the vessel 34. This probe 66 can be employed to control the throughput of the pump 26 which removes the purified gas, so as to maintain a stable pressure reduction in the vessel 34.

The cooling water circulates in a closed circuit between the granulation plant and the dehydration plant 55. In fact, after being injected through the spraying head 14, the water carries the granulate into the dehydration plant 55. This dehydration plant 55 consists of a funnel 50 which distributes the granules on a rotary roll 44 bounded externally by a filtering surface. The solid granules are entrained by the blades, not visible in this figure, upwards over the periphery of the roll 44. The lower part of these blades and the wall of the rotary roll 44 are of a filtering nature so as to permit a first filtration of the granulate. While the water flows through the filtering wall of the rotary roll, the solid granules are entrained upwards by the blades. On arriving in the upper half of the roll, the granules freed from the water begin to fall progressively downwards onto a conveyor belt 48. The granulate 46 of dehydrated slag is next removed towards a storage area.

The filtering wall of the rotary roll 44 is cleaned by jets 42 of compressed air originating from a compressed air conduit 40. The water, freed from the slag granules, is conveyed by means of a pump 54 towards the cooling tower 60. After compensating for losses, the water is pumped by pump 56 towards the spray head 14 and partly towards the water jets 30. The steam and air originating from the granulate dehydration plant 55 can be purified by the same plant described hereinabove. For this purpose the dehydration plant 55 is provided with a hood 55' which collects the mixture 57 of vapors and air rising by convection. This mixture is conveyed from the dehydration plant 55 towards the tower 20 through a chimney 38 which may be provided with a damper valve 36. This damper valve 36 makes it possible to control at any time the flow rate of air and vapors mixture conveyed into the tower 20 by this route.

Figure 2:
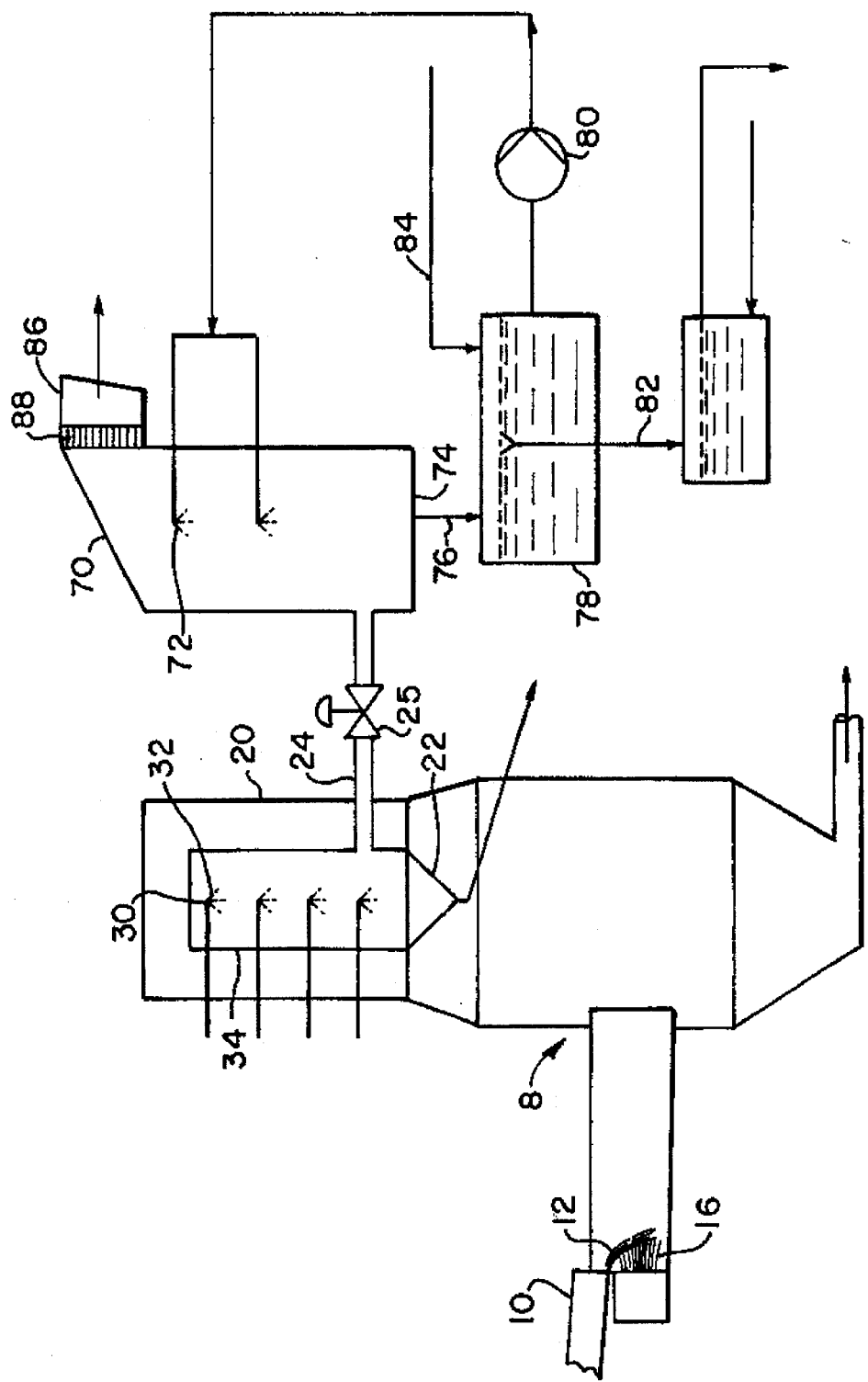
FIG. 2 is a diagrammatic elevation view, partly in cross section, of another preferred embodiment of the present invention.

FIG. 2 illustrates, diagrammatically, another preferred embodiment of the present invention. A granulation building 8 is shown in which a powerful water jet 16 is injected by means of a spraying head into a stream of molten slag 12 which is conveyed by a channel 10 from a blast furnace or from a slag ladle into the building 8.

The air contained in the lower part of vessel 34 is drawn off by a suction conduit 24 provided with a valve 25, to the lower part of a second vessel 70. Jets 72 arranged in said second vessel 70 spray alkaline water onto the air which is thus purified a second time. The water from the jets 72 is collected at the closed bottom 74 of the second vessel and evacuated by a conduit 76 to a retention basin 78.

The water is pumped from the retention basin 78 by a pump 80 back to the jets 72 in the second vessel 70. The retention basin 78 is provided with an overflow 82 through which the excess water is discarded. The alkalinity of the water in the retention basin 78 is continually checked and the quality and the quantity is adjusted through a feedpipe 84.

The air rising from the lower pan of the second vessel 70, to the open upper end of the second vessel, is purified a second time in the descending flow of water. The purified air is evacuated to the outdoors through the open upper pan 86 of the vessel 70.

The open upper part of the vessel contains a grid 88 to coalesce the water droplets contained in the air.

The present invention is not, however, limited to the embodiments described and shown above, but can advantageously be applied in all slag granulation and dehydration plants in which there is a release of vapors and sulphurous gases.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A device for treatment of a mixture of gases generated during the production of slag granulate in a granulation plant, comprising:

closed tower means to be disposed above the granulation plant for collecting the mixture of gases generated during the production of blast furnace slag granulate;

vessel means in said closed tower means, said vessel means having a closed lower end and an open upper end for the flow of said gases from said upper end toward said lower end, said vessel means be arranged vertically within said closed tower means;

water jet means in said vessel means for distributing alkaline water into said vessel means;

distribution conduit means connected to said water jet means for delivering alkaline water to said water jet means;

at least one flow conduit means connected to the lower end of said vessel means for removal of water and condensate from said vessel means;

at least one suction conduit means connected to said vessel means adjacent to the lower end thereof for removal of gases from said vessel means; and variable-throughput extraction means connected to said suction conduit means for removing gases from said vessel means and for maintaining a pressure reduction in said vessel means.

2. The device of claim 1 wherein said variable-throughput extraction means comprises a water jet pump wherein gases discharged from said water jet pump that remain uncondensed are in intimate contact with alkaline water flowing through said water jet pump.

3. The device of claim 2 further comprising:

closed degassing basin means having upper and lower pans;

a first conduit connecting said water jet pump to said closed degassing basin means;

a cooling tower;

a second conduit connecting the upper part of said closed degassing basin means to said cooling tower;

a settling basin; and a third conduit connecting the lower part of said closed degassing basin means to said settling basin.

4. The device of claim 1 further comprising:

probe means connected to said variable-throughput extraction means and to said vessel means adjacent to the lower end thereof for controlling the throughput of said variable-throughput extraction means as a function of pressure reduction within said vessel means.

5. The device of claim 3 further comprising:

a dehydration plant above the settling basin; and a chimney connecting said dehydration plant to said closed tower means.

6. The device of claim 5 wherein said chimney further comprises:

damper valve means for controlling flow rates of gases drawn from said dehydration plant into said vessel means.

7. The device of claim 1 wherein said variable throughput extraction means comprises a second vessel means having a closed lower end and an open upper end;

jet means arranged within said second vessel means;

second distribution conduit means connected to said jet means for delivering alkaline water to said second vessel means;

at least one flow conduit means emerging into the lower end of said second vessel means;

a retention basin means connected to said at least one flow conduit means; and a pump means connected to said retention basin and to said second distribution conduit means.

8. The device of claim 7 wherein said variable throughput extraction means further includes a valve in said at least one suction conduit means.

9. The device of claim 7 wherein said open upper end of said second vessel further includes a grid.

10. A device for treatment of a mixture of gases generated during the production of slag granulate in a granulation plant, comprising:

closed tower means to be disposed above the granulation plant for collecting the mixture of gases generated during the production of blast furnace slag granulate;

vessel means in said closed tower means, said vessel means having a closed lower end and an open upper end for the flow of said gases from said upper end toward said lower end, said vessel means be arranged vertically within said closed tower means;

water jet means in said vessel means for distributing alkaline water into said vessel means;

distribution conduit means connected to said water jet means for delivering alkaline water to said water jet means;

at least one flow conduit means connected to the lower end of said vessel means for removal of water and condensate from said vessel means;

at least one suction conduit means connected to said vessel means adjacent to the lower end thereof for removal of gases from said vessel means;

water jet pump extraction means connected to said suction conduit means for removing gases from said vessel means and for maintaining a pressure reduction in said vessel means;

closed degassing basin means having upper and lower parts;

a first conduit connecting said water jet pump extraction means to said closed degassing basin means;

a cooling tower;

a second conduit connecting the upper part of said closed degassing basin means to said cooling tower;

a settling basin; and a third conduit connecting the lower part of said closed degassing basin means to said settling basin.

11. A device for treatment of a mixture of gases generated during the production of slag granulate in a granulation plant, comprising:

a granulation plant for producing slag granulate, and wherein a mixture of gases is generated during the production of slag granulate;

closed tower means disposed above the granulation plant for collecting said mixture of gases generated during the production of slag granulate;

vessel means in said closed tower means, said vessel means having a closed lower end and an open upper end for the flow of said mixture of gases from said upper end toward said lower end, said vessel means be arranged vertically within said closed tower means;

water jet means in said vessel means for distributing alkaline water into said vessel means and into said gases in said vessel means;

distribution conduit means connected to said water jet means for delivering alkaline water to said water jet means;

at least one flow conduit means connected to the lower end of said vessel means for removal of water and condensate from said vessel means;

at least one suction conduit means connected to said vessel means adjacent to the lower end thereof for removal of gases from said vessel means; and variable-throughput extraction means connected to said suction conduit means for removing gases from said vessel means and for maintaining a pressure less than atmospheric in said vessel means.

12. The device of claim 11 wherein said variable-throughput extraction means comprises a water jet pump wherein gases discharged from said water jet pump that remain uncondensed are in intimate contact with alkaline water flowing through said water jet pump.

13. The device of claim 12 further comprising:

closed degassing basin means having upper and lower parts;

a first conduit connecting said water jet pump to said closed degassing basin means;

a cooling tower;

a second conduit connecting the upper pan of said closed degassing basin means to said cooling tower;

a settling basin; and a third conduit connecting the lower part of said closed degassing basin means to said settling basin.

14. The device of claim 11 further comprising:

probe means connected to said variable-throughput extraction means and to said vessel means adjacent to the lower end thereof for controlling the throughput of said variable-throughput extraction means as a function of pressure reduction within said vessel means.

15. The device of claim 13 further comprising:

a dehydration plant above the settling basin; and a chimney connecting said dehydration plant to said closed tower means.

16. The device of claim 15 wherein said chimney further comprises:

damper valve means for controlling flow rates of gases drawn from said dehydration plant into said vessel means.

17. The device of claim 11 wherein said variable throughput extraction means comprises a second vessel means having a closed lower end and an open upper end;

jet means arranged within said second vessel means;

second distribution conduit means connected to said jet means for delivering alkaline water to said second vessel means;

at least one flow conduit means emerging into the lower end of said second vessel means;

a retention basin means connected to said at least one flow conduit means; and a pump means connected to said retention basin and to said second distribution conduit means.

18. The device of claim 17 wherein said variable throughput extraction means further includes a valve in said at least one suction conduit means.

19. The device of claim 17 wherein said open upper end of said second vessel further includes a grid.

* * * * *